(12) United States Patent
Ramachandra

(10) Patent No.: US 11,275,579 B2
(45) Date of Patent: Mar. 15, 2022

(54) DISCOVERY AND AUTHORIZATION OPTIMIZATION OF GIT BASED REPOSITORIES

(71) Applicant: Bank of America Corporation, Charlotte, NC (US)

(72) Inventor: Madhukiran Bangalore Ramachandra, San Ramon, CA (US)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 16/874,072

(22) Filed: May 14, 2020

(65) Prior Publication Data
US 2021/0357209 A1  Nov. 18, 2021

(51) Int. Cl.
| | | |
|---|---|---|
| G06F 8/71 | (2018.01) | |
| G06F 16/25 | (2019.01) | |
| G06F 40/205 | (2020.01) | |
| G06F 8/36 | (2018.01) | |
| G06F 40/174 | (2020.01) | |
| H04L 29/06 | (2006.01) | |

(52) U.S. Cl.
CPC ............... G06F 8/71 (2013.01); G06F 8/36 (2013.01); G06F 16/252 (2019.01); G06F 40/174 (2020.01); G06F 40/205 (2020.01); H04L 63/10 (2013.01)

(58) Field of Classification Search
CPC ........................................................ G06F 8/71
See application file for complete search history.

(56) References Cited

U.S. PATENT DOCUMENTS

| | | | | |
|---|---|---|---|---|
| 8,832,640 | B1 * | 9/2014 | Roche | G06F 8/20 |
| | | | | 717/101 |
| 10,871,957 | B2 * | 12/2020 | Ryall | G06F 8/71 |
| 2006/0101443 | A1 * | 5/2006 | Nasr | G06F 8/71 |
| | | | | 717/163 |
| 2013/0117232 | A1 * | 5/2013 | Lee | G06F 16/213 |
| | | | | 707/639 |
| 2014/0173759 | A1 * | 6/2014 | Essary | G06F 21/10 |
| | | | | 726/30 |

* cited by examiner

*Primary Examiner* — Jae U Jeon
(74) *Attorney, Agent, or Firm* — Banner & Witcoff, Ltd.

(57) ABSTRACT

Aspects of the disclosure relate to providing limited access to and information about software in source code repositories in order to facilitate software development while maintaining information security and confidentiality. Source code in the repositories can be processed to extract, parse, normalize, and store metadata regarding the software in a source code database during preprocessing or on-demand if not previously processed. User interfaces and API(s) are provided to enable technologists and administrators to search for, retrieve, and manage metadata for source code and source code information in databases and repositories. Collectors and data analytic processors can mine source code and generate metadata regarding the source code stored in the repositories. Novel logical architectures, platforms, graphical user interfaces, and methods are disclosed.

18 Claims, 12 Drawing Sheets

FIG. 5

DISCOVERY AND AUTHORIZATION OPTIMIZATION OF GIT BASED REPOSITORIES

TECHNICAL FIELD OF DISCLOSURE

Aspects of the disclosure relate to processes, machines, and platforms for data processing and, in particular, for database and file management, data stores, software version management, data transformation, metadata generation and control, data normalization, indexing, and searching related to source code in repositories.

BACKGROUND

In order to facilitate software development and reuse of software components, programmers and businesses currently have limited options. All software, metadata, and documentation can be made available for viewing, sharing, and reuse either: (a) publicly, (b) internally with a defined team or pre-defined limited group of individuals with authorization within a company, or (c) internally with overly inclusive large groups of individuals or potentially everyone in a company. This can be accomplished through use of a git protocol on a publicly available or semi-publicly available development platform such as GitHub.

However, with an ever-increasing depth of technology and the traditional business need for silo mode(s) of development in order to protect confidentiality and provide internal company security, innovation is stifled because of a lack of software source code reuse. In essence, companies currently have a pseudo-binary choice of sharing essentially everything with almost everyone (which results in a lack of confidentiality and security) or sharing nothing (which prevents software reuse and wastes resources).

Thus, technologists in companies that require even a modicum of confidentiality and internal security end up wasting valuable resources by continuously "reinventing the wheel." This is because there is a lack of visibility into what has been developed before, what resources are available, where the resources can be found, and how to obtain permission to access or use the resources. And, there are no ubiquitous constructs to discuss shareable or reusable content.

Furthermore, existing use of inner open-source components utilized in programs is opaque and unknowable. This is a problem not only for code sharing purposes, but also for information security. In particular, there is a need to readily identify open source code present in source code in development as well as such components previously implemented in existing software applications. This is because developers and IT professionals need to be able to implement software patches as well as update or remove components whenever problems with open source code (e.g., software vulnerabilities or bugs) are detected such as, for example, by public statement, in a public forum, and/or are otherwise identified.

This disclosure addresses one or more of the shortcomings in the industry to overcome the foregoing technical problems as well as obviate the technical issues referenced below.

SUMMARY

Aspects of the disclosure provide effective, efficient, scalable, and convenient technical solutions that address and overcome the technical problems associated with maintaining information security and confidentiality while simultaneously facilitating software development including the identification and reuse of existing source code resources by utilizing the inventive processes, machines, and platforms described herein.

In some embodiments, a file management computing platform for providing limited access to and information about software source code to a client computing machine can be implemented. The file management computing platform may include: a first source code repository containing first source code; a server computing machine having at least one server processor, and at least one server communication interface communicatively coupled to the at least one server processor, the first source code repository, and the client computing machine. Server memory can be communicatively coupled to the server communication interface. The server memory can store server computer-readable instructions that, when executed by the at least one server processor, cause the server computing machine to perform various functions. For example, access, by the at least one server processor via the at least one server communication interface, can be made to the first source code repository. Extraction, by the at least one server processor from the first source code repository, can be made of first metadata corresponding to the first source code. The first metadata can be stored by the at least one server processor in a first sector of the server memory. The at least one server processor can parse the first metadata into first parsed data. The at least one server processor can store the first parsed data in a second sector of the server memory. The at least one server processor can normalize the parsed data into first normalized data. The at least one server processor can create, in a third sector of the server memory, a source code database. The database can either be stored inside the server or can be accessible from another location on the network via a communication interface. The at least one server processor can store the first normalized data in the source code database. The at least one server processor can perform, first analytic processing, on either the first source code information or the first source code, to generate first analytic data. The at least one server processor can store the first analytic data in the source code database. The at least one server processor can generate search portal graphical user interface instructions to enable a search, by the client computing machine, regarding the first source code. The at least one server processor can transmit, via the server communication interface to the client computing machine, the search portal graphical user interface instructions, which cause a search portal graphical user interface to be displayed on the display screen on the client computing machine. The at least one server processor can receive, from the client computing machine, a search request regarding the first source code. If the search request corresponds to software in the first source code repository, the at least one server processor can determine, first access rights for the client computing machine with respect to the first source code, and can extract, from the source code database, the first source code information. The at least one server processor can generate search result graphical user interface instructions for at least some of the first source code information based on the client computing machines' first access rights. And, the at least one server processor can transmit, via the server communication interface to the client computing machine, the search result graphical user interface instructions, which cause the search result graphical user interface to be displayed on the display screen on the client computing machine, whereby the search result graphic user interface displayed on the client computing machine's display screen can contain at least some of the first source code information. If desired, at least some of the first source of information can be less than full access to the first source code.

In some embodiments, searches may be limited by one or more of projects, dependencies, repositories, software product keys, tags, etc.

In some embodiments, a search portal graphical user interface can autopopulate the search request based on search text received from the client machine.

In some embodiments, the search result graphical user interface can provide an opportunity for a narrowing search.

In some embodiments, the search result graphical user interface can display search results that include one or more of a source code name, a project name, a software product key, a rating, a lock icon, other information, etc. And, the source code name, the project name, the software product key, the rating, the lock icon, or other information can be implemented as appropriately labeled URLs.

In some embodiments, the search result graphical user interface can provide a details URL to obtain details regarding the search results to be retrieved and displayed.

In some embodiments, the search result graphical user interface can include one or more of: a ReadMe URL to a ReadMe file for the first source code, and the ReadMe file can provide textual or other information describing or relating to the first source code; a maintainer URL to a maintainer list that identifies individual(s) responsible for maintaining the first source code; a version URL to version list identifying one or more versions of the first source code; a dependencies URL to a dependencies list identifying foundational source code on which the first source code is at least partially based; a dependent URL to a dependent list identifying dependent source code that was developed based on the first source code; and/or a review URL to a review list of reviews of the first source code.

In some embodiments, the search result graphical user interface can include: a demonstration URL to a demonstration of the first source code; a documentation URL to documentation regarding the first source code; an issues URL to an issues list identifying issues or potential problems with the first source code; and/or a release note URL to a release notes for the first source code.

In some embodiments, ReadMe information from the ReadMe file can be displayed in a ReadMe graphical user interface on the client computing machine's display screen in response to user selection of the ReadMe URL.

In some embodiments, ReadMe information can include one or more of usage information regarding the first source code; development setup information regarding the first source code; release history information regarding the first source code; news information regarding the first source code; and/or contribution information regarding development based on the first source code.

In some embodiments, the ReadMe graphical user interface on the client computing machine's display screen can contain action URLs (e.g., cloning, branch creation, pull request creation etc.) and/or navigation URLs (e.g., to source, commits, branches, network, pull requests, and/or forks).

In some embodiments, first analytic data can include dependencies and dependents for the first source code.

In some embodiments, a second source code repository contain second source code which is unprocessed and the server memory may also store further server computer-readable instructions relating thereto that, when executed by the at least one server processor, cause the server computing machine to perform additional functions. The at least one server processor may determine whether the search request corresponds to the second source code. If the search request corresponds to the second source code, the at least one server processor may process on-demand the second source code into processed data; store, in the source code database, the processed data; determine, second access rights for the client computing machine with respect to the second source code; extract, from the source code database, second source code information regarding the second source code; generate, second graphical user interface instructions for at least some of the second source code information based on the client computing machines' second access rights; and transmit, via the server communication interface to the client computing machine, the second graphical user interface instructions, which cause a second graphical user interface to be displayed on the display screen on the client computing machine, whereby the second graphic user interface displayed on the client computing machine's display screen contains said at least some of the second source code information. And, at least some of the second source of information may be less than full access to the second source code.

In some embodiments, processing of the second source code can include second analytic processing, on either the second source code information or the second source code, to generate second analytic data, and the second analytic data can be stored in the source code database.

In some embodiments, the second graphical user interface can include a ReadMe URL to a ReadMe file for the second source code. The ReadMe file can provide textual information describing the second source code including one or more of: usage information regarding the second source code; development setup information regarding the second source code; release history information regarding the second source code; news information regarding the second source code; and/or contribution information regarding development based on the second source code. The textual information describing the second source code can be displayed in a ReadMe user interface on the client computing machine's display screen in response to selection of the ReadMe URL.

In some embodiments, a computer-implemented method for providing limited access to and information about software source code to a client computing machine coupled to a network can be used. An access right computer machine can access first source code in a first source code repository, which can be coupled to the network. The access right computer machine can have: at least one processor, non-volatile memory, and a communication interface coupled to the network. The at least one processor can preprocess the first source code data into first source code information and store it in a source code database. The at least one processor can receive, from the client computer machine via the communication interface, a source code request. If the source code request corresponds to the first source code, the at least one processor can determine, in response to the source code request, whether the client computer machine has first access rights to the first source code. If the client computer machine has said first access rights, the at least one processor can retrieve at least some of the first source code information from the source code database, and can provide to the client computing machine at least some of the first source code information. If the source code request does not correspond to the first source code, the access right computer can access the second source code in a second source code repository. The access right computer can then perform on-demand processing of the second source code data into second source code information and can store it in the source code database. The at least one processor can determine, in response to the source code request, whether the client computer machine has second access rights to the second source code. If the client computer machine has said second access rights, the at least one processor can retrieve at least some of the second source code information from the source code database and provide it to the client computing machine that made the request.

In some embodiments, a non-transitory computer-readable medium can have computer-executable instructions stored thereon that are executed by a processor on an access right computer machine to provide limited access to and information about software source code to a client computing machine. The instructions may include first storage instructions to store first source code in a first source code repository, second storage instructions to store second source code in a second source code repository, access rights instructions to determine access rights for the client computing machine with respect to the first source code and second source code, preprocessing instructions to process the first source code into first source code information and store the first source code information in a source code database, request instructions for receiving a request from the client computing machine for either the first source code or the second source code, on-demand processing instructions to process the second source code into second source code information and store the second source code information in the source code database if the request is for the second source code, and graphical user interface instructions for providing, in response to the request, the client computer machine with graphical user interface information corresponding to at least a portion of said first source code information or said second source code information if the client computing machine has said access rights.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 shows a sample user interface that can provide search results in accordance with one or more aspects of this disclosure.

DETAILED DESCRIPTION

Figure 1A:
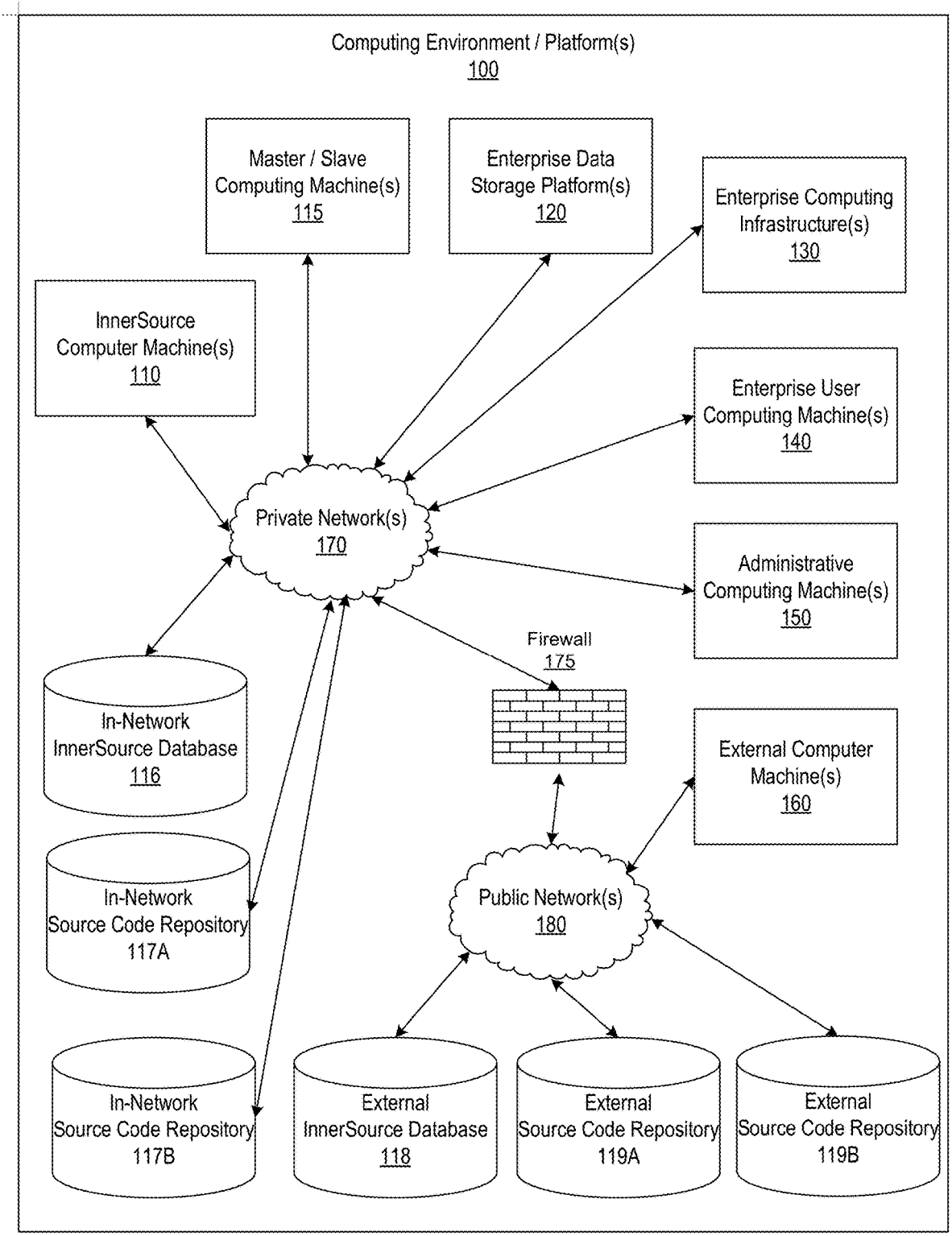
FIGS. 1A and 1B depict illustrative computing environment(s), client-server configurations, InnerSource computer machines, platform(s), and/or module(s), in accordance with one or more environments, for selectively providing limited access to and information about source in repositories in response to requests from users or client machines.

In the following description of various illustrative embodiments, reference is made to the accompanying drawings, which form a part hereof, and in which is shown, by way of illustration, various embodiments in which aspects of the disclosure may be practiced. Various aspects of the disclosure and/or embodiments may be implemented on a private, semi-private, and/or public basis; may be structured internally within a company environment, externally outside a company environment, and/or partially inside and partially outside the company environment; and may be accomplished in one or more standalone and/or distributed configurations. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and/or data" can include one or more: algorithms, applications, application program interfaces (APIs), attachments, big data, collectors, daemons, data analytic processors, emails, encryptions, databases, data repositories, data structures (including cubes, hypercubes, data warehouses, datasets, etc.), data sources, drivers, file systems or distributed file systems, firmware, graphical user interfaces, images, instructions, machine learning, middleware, modules, multidimensional databases, multidimensional database management systems, multidimensional data structures, objects, online analytical processing (OLAP applications, cubes and data storage, relational databases, etc.), operating systems, processes, protocols, programs, repositories, scripts, source code, tools, utilities, and VPNs. The computer-executable software and data is on tangible, computer-readable memory (local, in network-attached storage, remote, and/or online), can be stored in volatile or non-volatile memory, and can operate automatically and/or autonomously, based on event triggers, on-demand, on a schedule, and/or as part of batch processing. It can operate in real time or otherwise.

"Computer machine(s)," "computer platform(s)," "computing environment(s)," "computing infrastructure(s)," "logical architecture(s)," and/or combinations of one or more of the foregoing as well one or more aspects of "InnerSource" integrated and/or distributed implementations thereof and/or at least partial implementation of "InnerSource" functionality described herein, or the like can include one or more: special-purpose network-accessible administrative computers, clusters, computing devices or computing machine(s), computing platforms, desktop computers, distributed systems, enterprise computers, laptop or notebook computers, master computers, nodes, personal computers, portable electronic devices, servers, slave computers, smart devices, tablets, and/or workstations, which have one or more microprocessors, cores, and/or executors such as for executing or accessing the computer-executable software and data. References to computer machines, platforms, environments, infrastructures, architectures, and names of devices included within the foregoing definition(s) are used interchangeably in this specification and are not considered to be limiting or exclusive to only a specific type of device or location of the device; specific type of user or location of the user; or specific location of types of functionality (e.g., standalone, distributed, in-network, or external). Instead, references in this disclosure to computing machines, computing environments, computing platforms, logical architectures, and/or InnerSource functionality incorporated in any of the foregoing, and the like are to be interpreted broadly as understood by skilled artisans.

As used in this specification, computer machines, platforms, environments, and logical architectures and/or InnerSource implementations therein also include all hardware and components typically contained therein such as, for example, processors/executors/cores 111, volatile and non-volatile memories 112, modules in memory 112A-112U, communication interfaces 113, monitor(s) 114, and keyboards (not shown) or other input devices (not shown) etc.

Volatile and non-volatile memories 112 may be comprised of one or more internal, external, removable, and/or network-accessible computer-readable media, and may contain a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet and public networks 180, wireless networks, digital subscriber line (DSL) networks, frame relay networks, asynchronous transfer mode (ATM) networks, private networks 170, virtual private networks (VPNs), or any combination of any of the same. Networks also include associated "network equipment" such as access points, ethernet adaptors (physical and wireless), firewall(s) 175, hubs, modems, routers, security devices, and/or switches located inside the network and/or on its periphery, as well as software executing on and/or implementing any of the foregoing.

FIG. 1 depicts a various aspects of illustrative computing environment(s)/platform(s) 100, in accordance with one or more aspects of this disclosure, for maintaining information security and confidentiality while simultaneously facilitating software development including the identification and reuse of existing source code resources by utilizing the inventive processes, machines, and platforms described herein. Computing environment/computing platform(s) 100 may include one or more in-network and/or external computer machine(s), system(s), and/or platform(s). For example, computing environment 100 may include various computer machine(s) such as one or more InnerSource computer machine(s) 110 (e.g., for setup, scripting, metadata generation, source code component detection and identification, data normalization, implementation and/or management of the functionality described herein, etc.), master and/or slave computer(s) 115 (e.g., for distributed processing, load balancing, data storage, etc.), enterprise data storage platform(s) 120 (e.g., for storing any of the software and/or data referenced herein), enterprise computing infrastructure 130 (e.g., for implementing company-specific or other network functionality or computer software and data, for providing various enterprise and/or back-office computing functions for an organization, etc.), enterprise user computing machine(s) 140 (e.g., used by software developers or technologists to develop source code or components, to share source code or components, and/or to publish information about source code or components, etc.), administrative computing machine(s) 150 (e.g., used to manage InnerSource functionality, provide or control access rights, manage resources, detect changes to open source code, detect public notifications of open source code vulnerabilities, disseminate information regarding open source software bugs or vulnerabilities, etc.), and external computer system(s) 160 (e.g., for remote access, remote source code development, remote implementation or management of any InnerSource functionality, remote processing, and/or performing any other remote functions or actions). In addition, client-server arrangements may be implemented using one or more of the foregoing. For example, the InnerSource computer machine(s) 110 could be implemented as or on one or more server(s) to provide services and functions to one or more client machines such as enterprise user computing machine(s) 140, administrative computer machine(s) 150, external computer system(s) 160, one or more other infrastructures, and the like.

As illustrated in greater detail below, each element in computing environment 100 may include one or more computing machine(s) and associated components operating computer software and data configured to perform one or more of the functions described herein. Moreover, the functions performed by one machine or platform, or in one infrastructure, could be implemented on another machine, platform, or infrastructure in the environment in accordance with one or more various aspects of this disclosure.

Computing environment 100 may include one or more source code repositories and/or data sources/data stores that are in-network such as 117A and 117B, and/or are external (e.g., outside the network) such as 119A and 119B, and may contain applications or other computer software and data including, but not limited to, source code, source code components, or other data that may be shared or potentially available for access or for which information may be provided. Computing environment 100 may include one or more internal and/or external InnerSource databases such as 116 and 118, which may contain computer software and data such as metadata or other descriptive information related to materials stored in repositories 117A, 117B, 119A, or 119B. Additionally, and/or alternatively, repositories 117A, 117B, 119A, or 119B may be implemented, in whole or in part, internally as part of one or more of any of InnerSource computer machine(s) 110, master and/or slave computer(s) 115, enterprise data storage platform(s) 120, enterprise computing infrastructure(s) 130, enterprise user computing machine(s) 140, administrative computing machine(s) 150, and/or external computer system(s) 160.

Computing environment 100 also may include one or more networks, which may directly or indirectly interconnect one or more of InnerSource computer machine(s) 110, master and slave computer machine(s) 115, in-network or external repositories or data source(s)/store(s) 117A, 117B, 119A, or 119B, enterprise data storage platform(s) 120, enterprise computing infrastructure(s) 130, enterprise user computing device(s) 140, administrative computing device(s) 150, and external computer system(s) 160.

Computing environment 110 may include one or more firewalls 175, which protect or filter data for machines, platforms, data and the like inside the private network from unauthorized users or processes operating inside and/or outside the private network.

In one or more arrangements, computer machine(s), platform(s), and other system(s) included in computing environment 100 may be any type of computing device(s) capable of providing a user interface, receiving input via the user interface, acting on the input, accessing or processing data, controlling other computer machine(s), platform(s), infrastructure(s), and/or component(s) of any of the foregoing based on the input, communicating the received input to one or more other computing machine(s), and propagating software and/or data to other machine(s), platform(s), system(s), repositories, data source(s)/data store(s), and the like. As noted above, and as illustrated in greater detail below, any and/or all of the computer machine(s) of computer environment 100 may, in some instances, be special-purpose computing device(s) configured to perform specific functions.

Figure 1B:
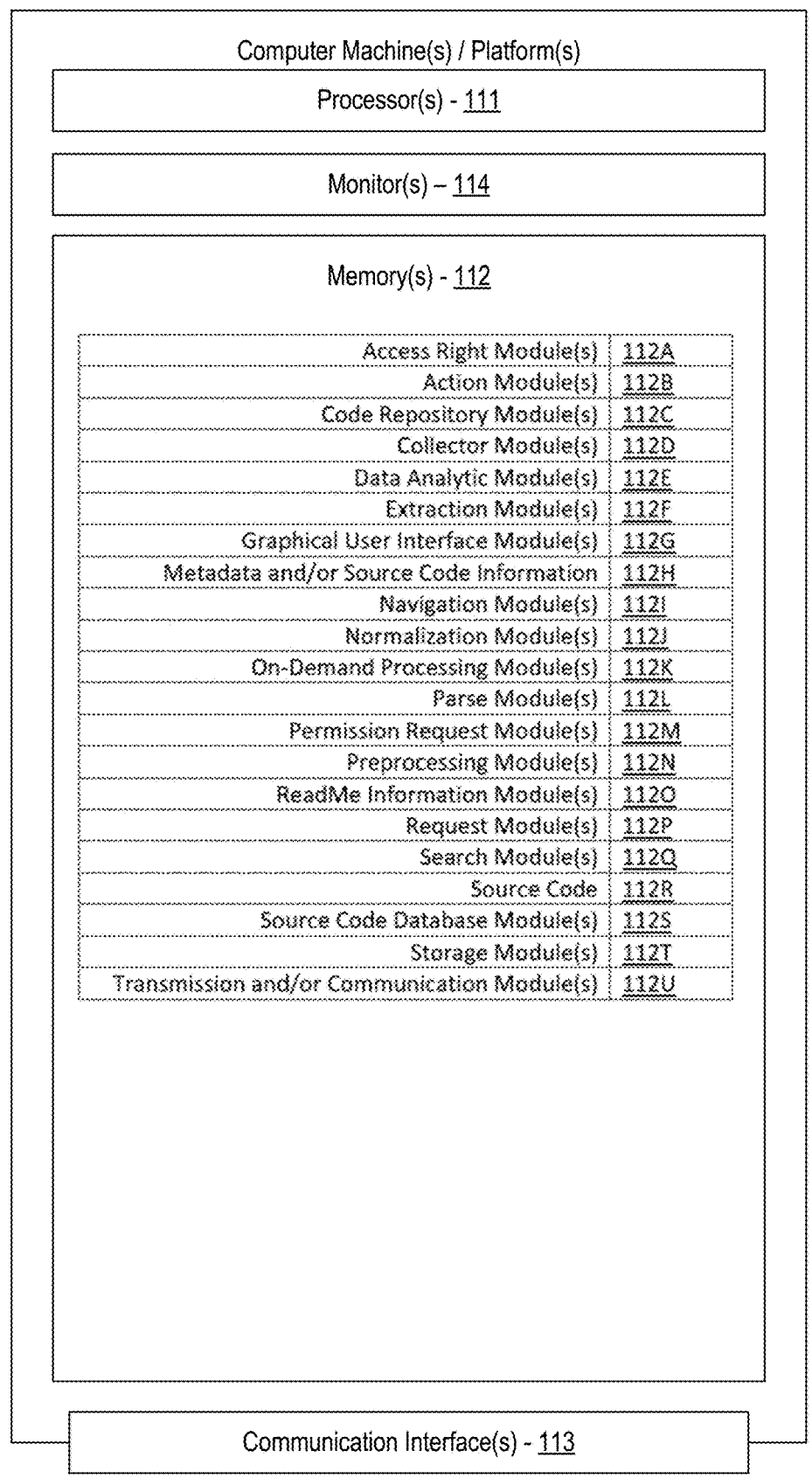

Referring to FIG. 1B, one or more computer machine(s) or platform(s), such as, for example, InnerSource computer machine(s) 110, may include one or more processors, executors, cores, etc. 111, memory 112, communication interface 113, and monitor(s) 114. A data bus may interconnect processor 111, memory 112, communication interface 113, and/or monitor(s) 114. Communication interface 113 may be a network interface configured to support communication between one or more computer machines in computer environment 100 and one or more networks (e.g., private network 170, public network 180, or the like).

Memory 112 may be volatile or non-volatile, and may include computer software and data such as, for example, one or more program modules having instructions that when executed by processor 111 cause a computer machine, such as InnerSource computer machine(s) 110, to perform one or more functions described herein and/or access, process, analyze, manipulate, interact with, perform data acquisition, and/or control one or more source code repositories or other data stores or data warehouses, big data, or other file systems that may store and/or otherwise maintain information, which may be used by such program modules and/or processor 111. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: Access Right Module(s) 112A (e.g., for determining and/or assigning access rights to select source code, projects, source code information etc.), Action Module(s) 112B (e.g., to enable actions to be performed on source code or source code data such as cloning, branch creation, pull request creation, etc.), Code Repository Module(s) 112C (e.g., for storing or managing source code in repositories), Collector Module(s) 112D (for collecting source code, source code information, etc. from source code repositories), Data Analytic Module(s) 112E (e.g. for performing data analytics on source code or source code information), Extraction Module(s) 112F (e.g., for extracting source code form repositories), Graphical User Interface Module(s) 112G (e.g., for generating graphical user interfaces, manipulating the graphical user interfaces or components included therein, facilitating searches, receiving inquiries and requests, providing search results, etc.), Metadata and/or Source Code Information 112H (e.g., anything referring to, related to, and/or describing the corresponding source code), Navigation Module(s) 112I (e.g., for facilitating navigation to source materials, commits, branches, network, pull requests, forks, etc.), Normalization Module(s) 112J (e.g., for normalizing data into desired database formats or structures), On-Demand Processing Module(s) 112K (e.g., for processing source code or source code information that was not previously processed), Parse Module(s) 112L (e.g., for parsing source code or source code information), Permission Request Module(s) 112M (e.g., to enable requestors or client machines to request access to underlying source code for which sufficient permissions are not already possessed), Preprocessing Module(s) 112N (e.g., to perform batch or other processing of data contained in source code repositories in order to speed up search and retrieval of source code or source code information), ReadMe Information Module(s) 112O (e.g., for providing shareable limited information regarding source code), Request Module(s) 112P (e.g., to facilitate search requests by users or client machines), Search Module(s) 112Q (to perform searches of source code or source code information), Source Code 112R, Source Code Database Module(s) 112S (e.g., to store source code identifiers and source code information), Storage Module(s) 112T (e.g., to store source code information or other data in memory), and Transmission and/or Communication Module(s) 112U (e.g., to enable communication between clients, administrators, technologists, platforms, databases, repositories, and the like, etc.).

Figure 2:
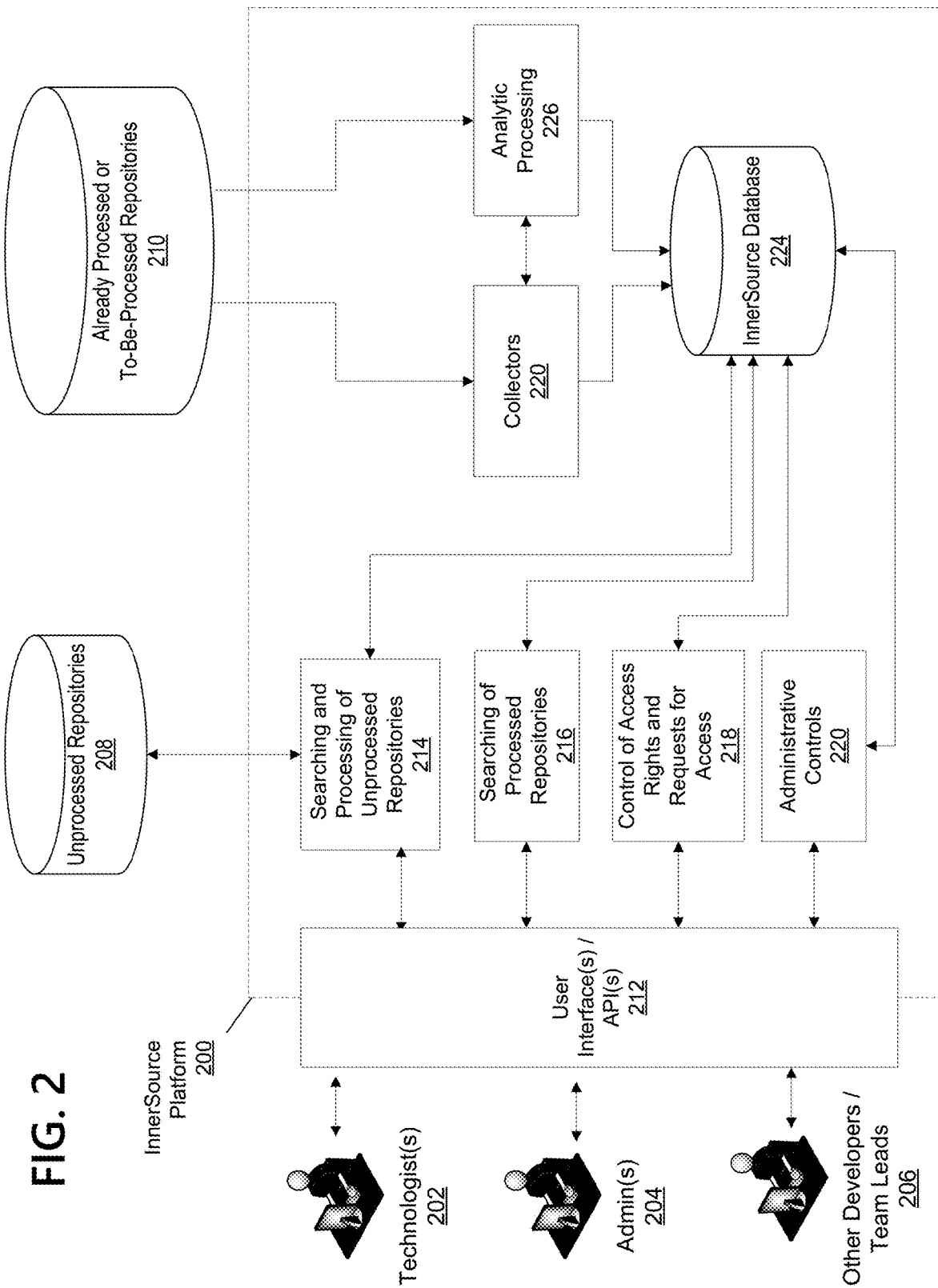
FIG. 2 depicts a sample illustrative logical architecture for implementing one or more aspects of this disclosure.

Referring to FIG. 2, a sample illustrative logical architecture for implementing one or more aspects of this disclosure is shown. An InnerSource platform 200 can incorporate various elements, components, and functionality in order to facilitate software development including the identification and reuse of previously developed source code resources and/or components thereof while simultaneously retaining information security and confidentiality.

Technologists 202, administrators 204, and previously and/or concurrent other developers/team leaders 206 for developed projects or projects under development, can each interact with InnerSource platform 200 as well as with source code repositories 208, 210 via one or more user interfaces/APIs 212. The source code repositories can include one or more unprocessed repositories 208, which can store code that was not previously processed by the InnerSource or other platform(s) 200 and which can be accessed by platform 200 on-demand as needed. The source code repositories can also include one or more already processed or to-be-processed repositories 210, which can store code that InnerSource platform 200 has already processed (e.g., source code that has been collected, analyzed, normalized, and for which metadata has been generated and stored in one or more repositories and/or databases) or that is to be processed in the future.

InnerSource platform 200 can include and/or integrate with software and/or data that (a) can search and/or process repositories that have not previously been processed 214, (b) can search processed repositories 216, (c) can control access rights and/or requests for access 218, and (d) provide administrative controls 220.

InnerSource platform 200 can also include and/or integrate with software and/or data such as collectors 222 that can search for source code to be processed, process the code to identify information to be stored in InnerSource database 224, normalize the information for storage in InnerSource database 224, etc. InnerSource platform 200 may also include and/or integrate with software and/or data to perform analytic processing 226 of code in repositories like 210 and to store such analytic processing results in InnerSource database 224. More specific discussions of InnerSource platform 200 functionality and corresponding computer software and/or data is explained below in reference to other figures in this disclosure.

Figure 3:
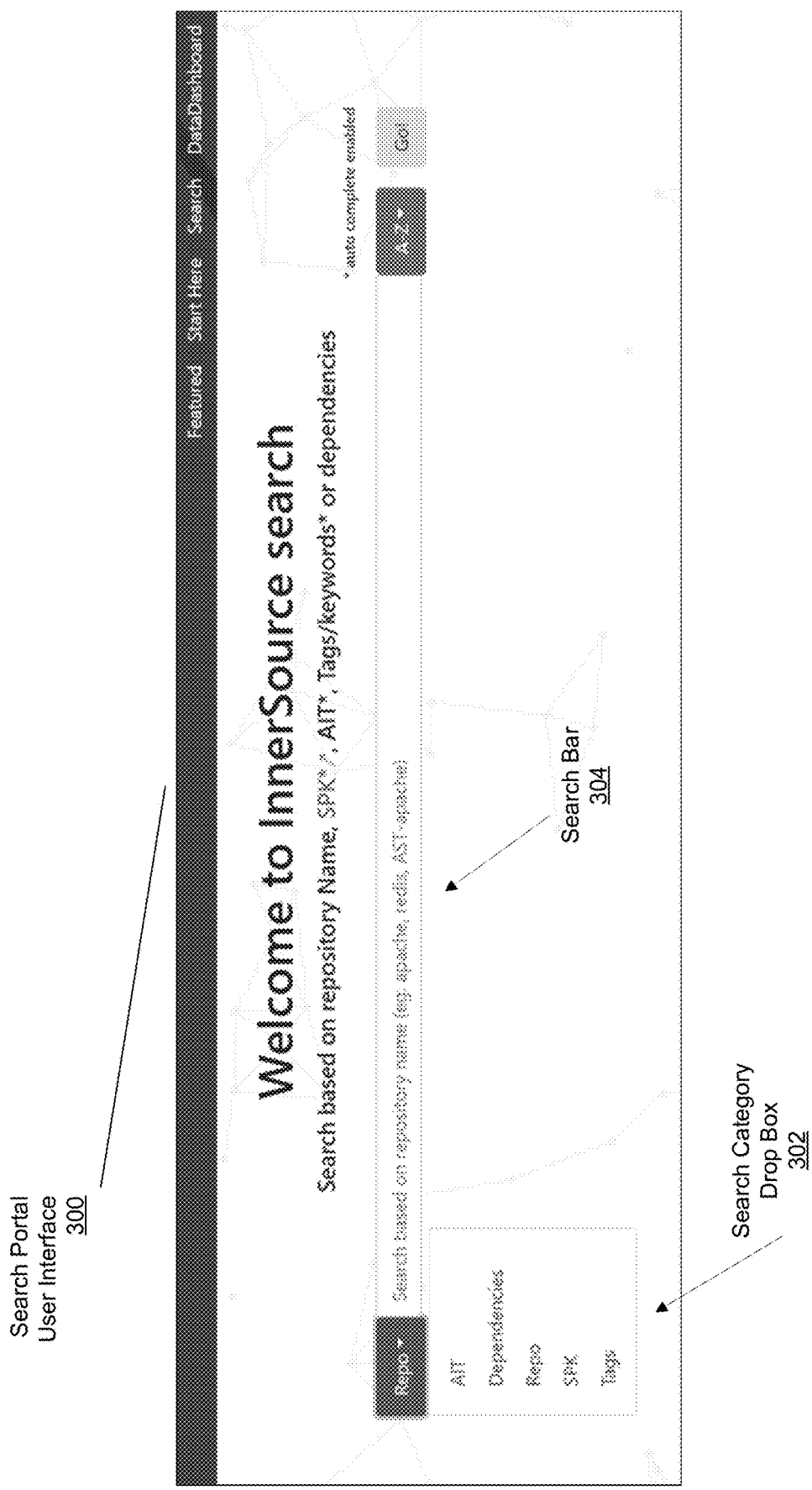
FIG. 3 depicts a sample search portal interface in accordance with one or more aspects of this disclosure.

FIG. 3 depicts a sample search portal user interface 300 that can be implemented as part of user interfaces/APIs 212 to enable technologists 202, administrators 204, and/or other developers/team leads 206 to search (or trigger processing) by component 214 of unprocessed repositories 208 or to search (or trigger processing), as in component 216, of already processed or to-be processed repositories 210.

Search terms can be entered into search bar 304 or the like. A search category drop box 302 can be used to limit searches to one or more specific: (a) clients or project names ("AIT"), (b) dependency or dependencies (e.g., code known to contain certain components or code), (c) repository or repositories ("Repo"), (d) software product key(s) ("SPK"), (e) tags, and/or any other category, location, or construct. Dashboards, tutorials, instructions, suggestions, etc. may also be identified or selectable in the user interface if desired.

Figure 4:
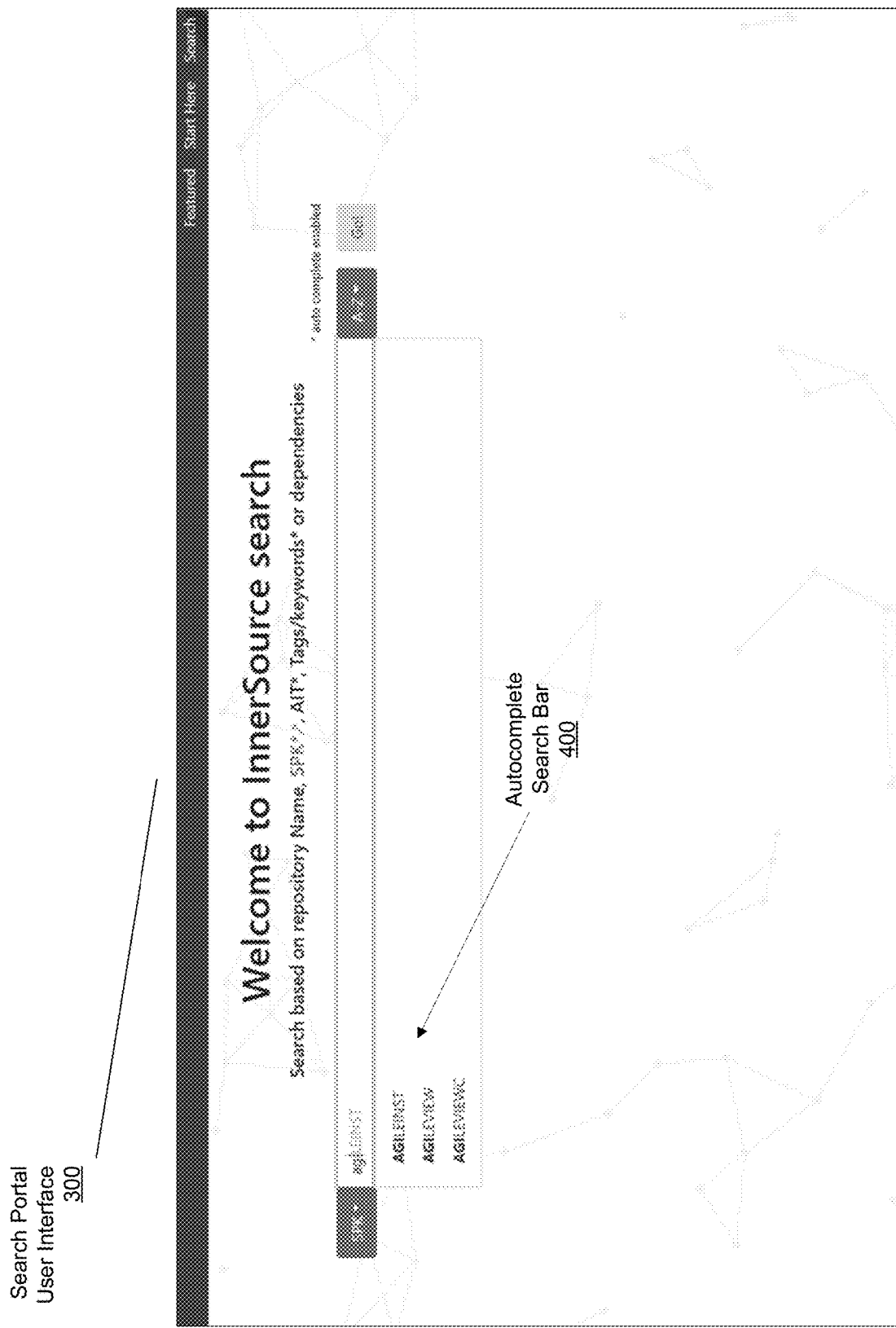
FIG. 4 illustrates search autocomplete functionality for various aspects of this disclosure.

As illustrated in FIG. 4, the search portal 300 may also include an autocomplete search bar 400 or include autocomplete search capabilities. As used herein, the term autocomplete refers to a software function that gives users the option of completing words or forms by a shorthand method on the basis of what has been typed before. In this example, typing the letters "agi" could provide suggested autocompletion for prior terms such as, in this example, in the category of SPK for "AGILEINST," "AGILEVIEW," and "AGILEVIEWC."

Figure 5:
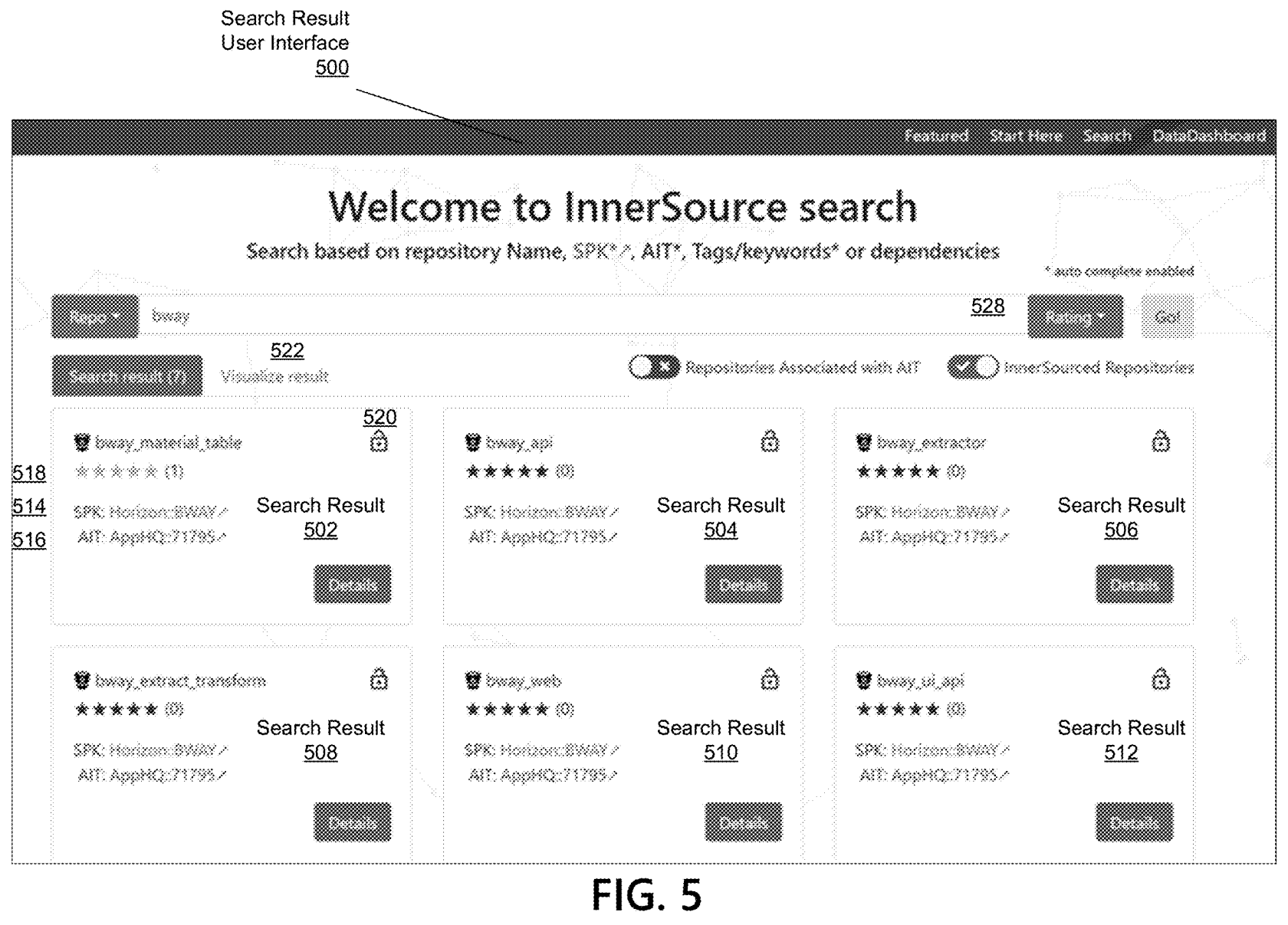

FIG. 5 shows a sample user interface showing search results 500. In this example, the user searched for "bway" in the repository category. Various search results were returned as a result of the search such as results 502, 504, 506, 508, 510, 512. The search results can identify the name of the source code such as, for example in this illustration, bway_material_table, bway_api, bway_extractor, bway_extractor_transform, bway_web, and bway_ui_api, respectively. Each search result may also identify the corresponding software product key 514, project name 516, and review rating 518. A lock icon 520 may also be depicted to show whether the source code is editable and/or accessible by the user. If not, the user may need to request permission from the authorized individual, project leader, or administrator. User interface 500 may also allow visualization of search results 522 as well as search modifications such as only searching repositories associated with a project 524 and whether repositories other than InnerSourced repositories should be searched 526. Searching or sorting of search results based on ratings 528 is also possible.

Figure 6:
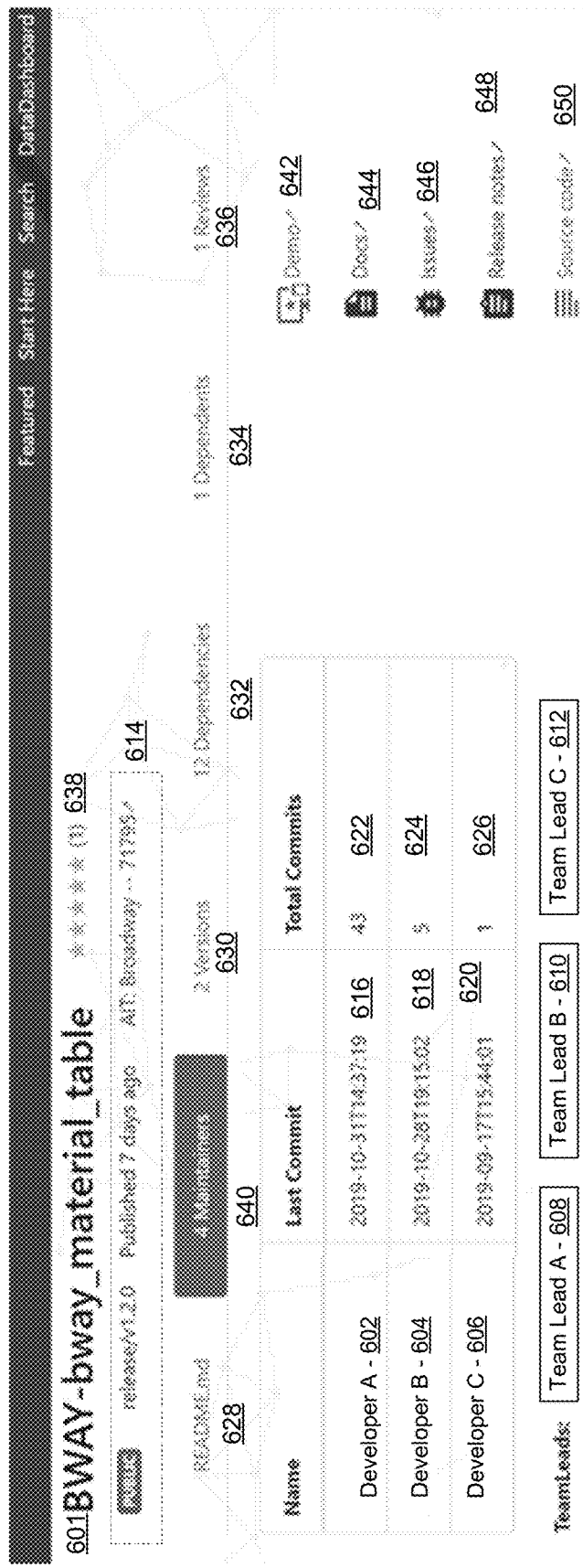
FIG. 6 depicts a sample code maintainer user interface in accordance with one or more aspects of this disclosure.

Selection of a search result 502, 504, 506, 508, 510, or 512 in the search result user interface 500 can trigger display of a code maintainer 600 or other user interface such as shown in FIG. 6 and can display the name of the source code 614. In short, this type of interface allows discovery of the individuals who are responsible for maintaining the code, who contributed to development of the code, and/or who control access rights to the code. The source code name 614, project name 616, repository name or folder 618 or other identification information can be displayed.

Other relevant information such as whether the source code is public (either public in the company, public outside of the company, private, or other designated access rights), the release date and version, the publication date or days since publication, project name, repository name or folder (collectively 614) or the like can be shown.

Each developer who has worked on the particular source code file can be identified 602, 604, 606 along with their respective last commit or other commit dates 616, 618, 620 and total number of commits 622, 624, 626. Team leads 608, 610, 612 for the developers, projects, or source code files can be identified too in order to facilitate communications between a technologist seeking access to the code file as well as to request access to source code for which specific access rights are required.

Code maintainer user interface 600 may also contain links or the like to toggle between other screens relevant to the source code such as a "ReadMe" file 628 for the code, a version page to identify various versions or commits of the code 630, a dependencies page 632 to identify the code components or projects incorporated in source code 601, a dependents page 634 to identify any code or projects that are relying on or using source code 601, a link to a review page 636 (such as the code review user interface 800 shown in FIG. 8), and a link 640 to get back to the maintainer screen 600. A star rating 638 or the like for the source code may be displayed next to the code name as well if desired.

Code maintainer user interface 600 may also have links or the like to page(s) such as demo page 642 in order to see a demonstration of any executable or other portions of the code, docs page 644 to access documentation related to the code, issues page 646 that can identify any existing bugs or other problems, release notes page 648 to provide notes regarding the code or code version, and a source code page 650 to enable downloading or viewing of the source code 601 or components thereof.

Figure 7:
FIG. 7 illustrates a sample code dependency user interface in accordance with one or more aspects of this disclosure.

If the link to the dependencies page 632 is selected in FIG. 6, code dependency user interface 700 or the like can be loaded and displayed in a code dependency user interface as shown in FIG. 7. This user interface can identify each software component 702 (by name or otherwise) used in the source code as well as the version 704 of the code component. Individual code components 702 may also be selectable for viewing, editing, and/or downloading if desired depending on appropriate permissions and access rights.

Figure 8:
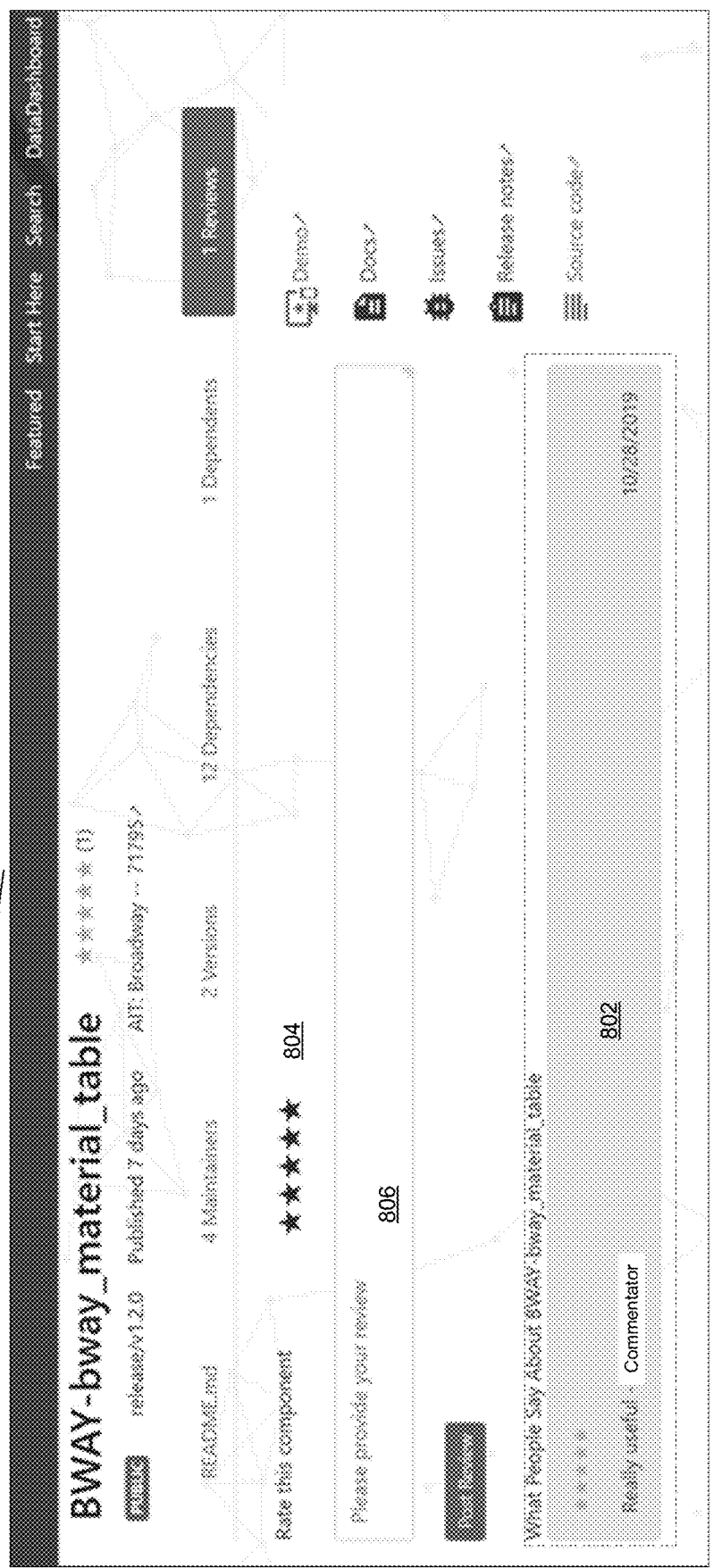
FIG. 8 depicts a sample code review user interface in accordance with one or more aspects of this disclosure.

As shown in FIG. 8, a code review user interface 800 can be loaded from the review link 636 in FIG. 6 or the like. This interface 800 may display past reviews, ratings, review dates, and identifier the reviewers (collectively 802). Interface 800 may also allow a reviewer to assign a star rating 804 or the like as well as to provide text comments 806 on the source code.

Figure 9:
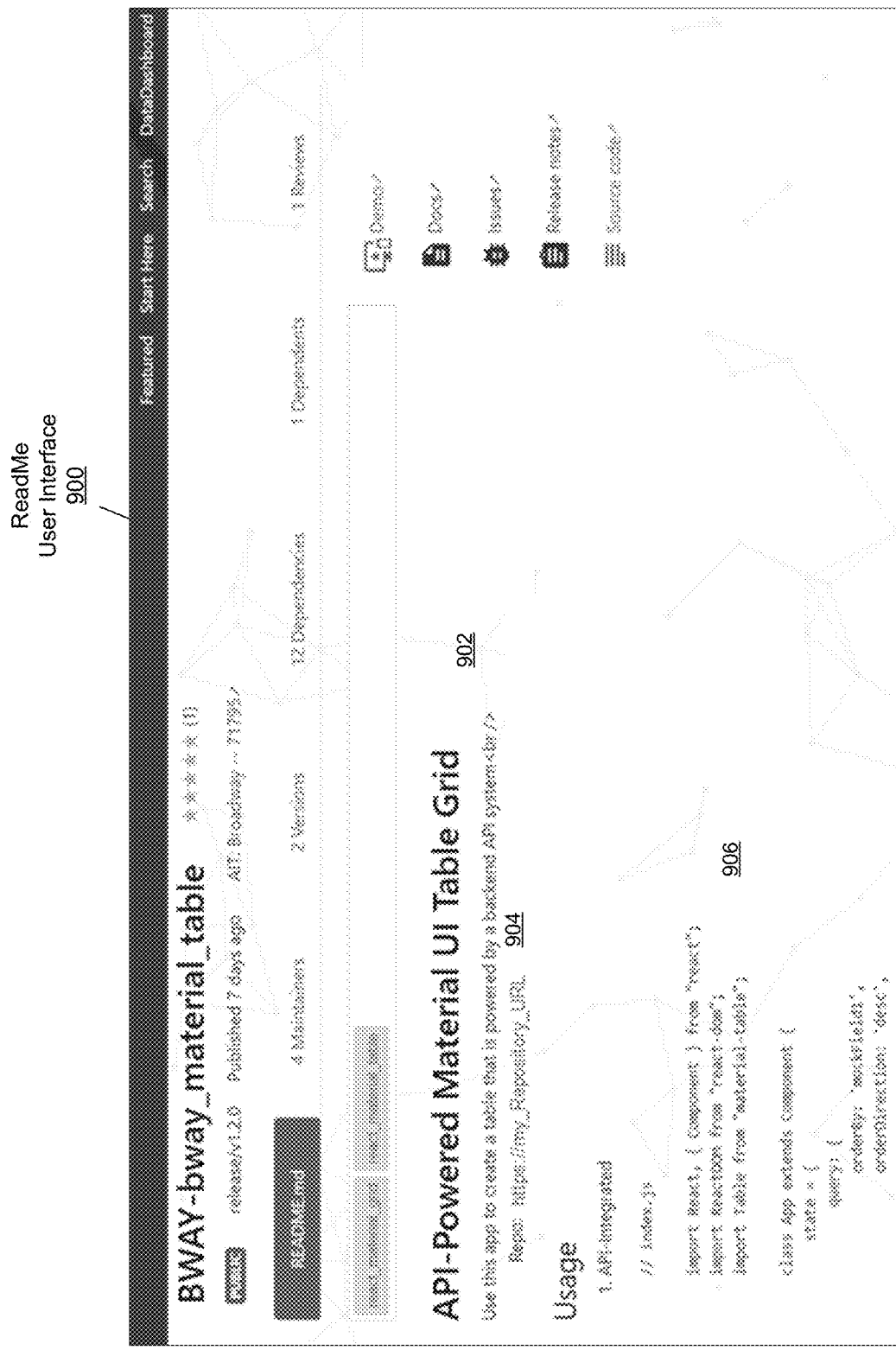
FIGS. 9 and 10 illustrate sample ReadMe screens that can be displayed in accordance with one or more aspects of this disclosure.
Figure 10:
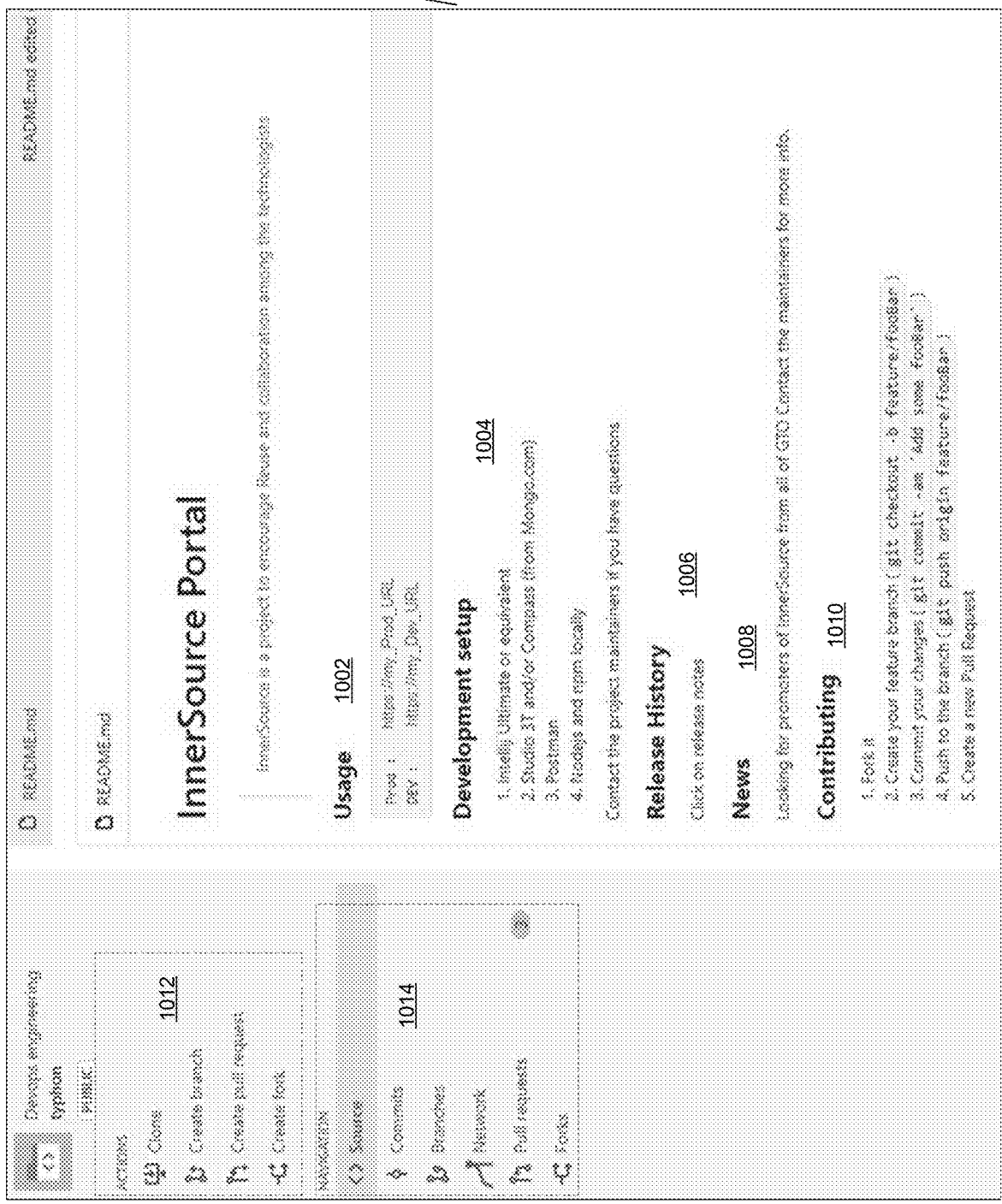

FIGS. 9 and 10 illustrate sample ReadMe screens 900, 1000 that can be displayed when the ReadMe link 628 is selected. This file is particularly helpful to technologists because it can be a standard location where information that technologists desire to share for a particular project or source code can be made available to authorized individuals and groups.

As shown in FIG. 9, the ReadMe user interface can include descriptive information like 902 to identify, generically or otherwise, the source code or project. The repository name or location 904 can be identified. Standard usage information 906 and applicable code excerpts, pseudo code, or the like can be provided 906 with comments and programming information if desired.

As shown in FIG. 10, additional and/or different information can be provided as part of a ReadMe file as in ReadMe user interface 1000. In this example, usage information and URLs for production and development code locations can be identified as in 1002. A development setup 1004 can be provided to initialize and utilize the source code. A release history 1006 and new sections 1008 can be provided if desired. Instructions and/or options for contributing 1010 to the source code can be provided.

Various public and/or private actions can be made available to authorized technologists such as cloning the code, creating a branch in the code, creating pull requests, and/or creating forks (collectively 1012). Navigation options such as switching to the source, commits, branches, network, pull requests, and/or forks, etc. (collectively 1014) can be provided as well.

Figure 11:
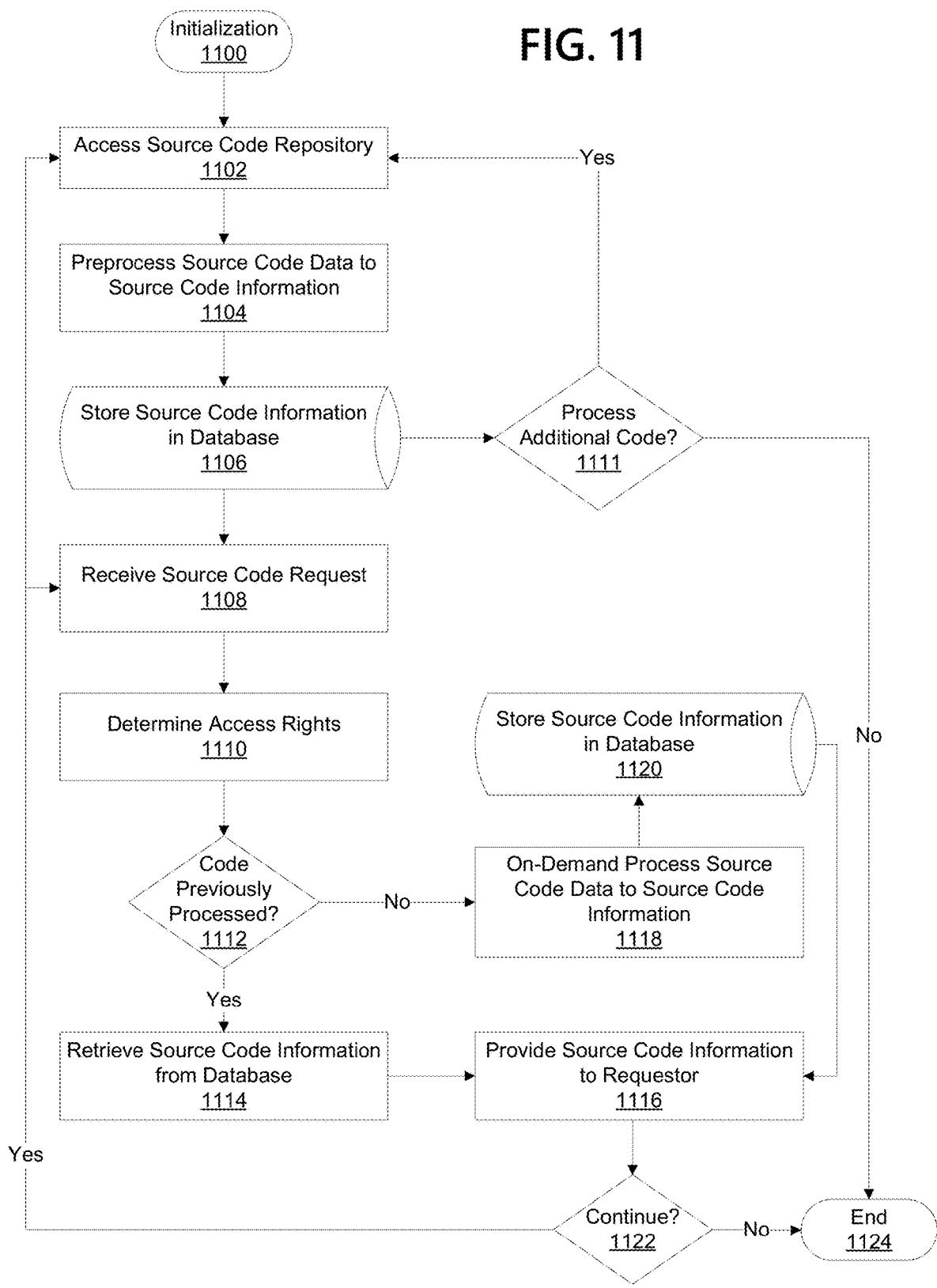
FIG. 11 shows a sample high-level flow diagram illustrating one or more various aspects of this disclosure in order to provide limited access to and information about software source code to a client computing machine requesting access or information.

FIG. 11 shows a sample high-level flow diagram illustrating one or more various aspects of this disclosure in order to provide limited access to and information about software source code to a client computing machine requesting access or information.

Initially, the platform of this disclosure can be set up prior to use in step 1100. As part of this, one or more source code repositories can be accessed in step 1102. The source code in the repository or repositories can be preprocessed into source code information (step 1104) and stored in a source code database (step 1106). This preprocessing (step 1104) can include, inter alia, extracting the source code or metadata regarding the source code, storing the metadata or the like in memory, parsing the metadata or the like into parsed data, storing the parsed data in memory, normalizing the data for database consistency or best practice purposes for efficient retrieval and searching, storing the normalized data in memory, creation of a source code database (if not previously created), and/or analytically processing the normalized data or the source code data in the repository, etc. The normalized data and/or the analytic data can be stored in the source code database (step 1106). This process, in whole or in part, can be repeated (step 1111) as necessary in order to preprocess and store in the source code database some or all of the source code in one or more various repositories, as desired.

Whenever a request for source code or source code information is received from a client machine as in step 1108, a determination (step 1110) can be made regarding access rights for the client machine or user of the client machine. For example, a user may have complete access rights which would allow the user to access the source code itself without limitation. Alternatively, the user or machine may only have limited rights such that only some or all of the source code information, regarding the source code, is available for viewing or sharing. The last option would be that the user has no access rights, limited or otherwise, to even the source code information.

If a request for source code or source code information is made (step 1108), and if the user or machine has sufficient access rights (step 110), a determination is made as to whether the requested source code has been previously processed in step 1112. If the code was not previously processed, an on-demand process can be applied to the applicable source code to generate the source code information (step 1118) in a similar manner as discussed above with respect to the processing described in step 1104, and the resulting source code information can be stored in the source code database (1120). Thereafter, it can be provided to the requesting user or machine (step 1116) if sufficient access rights are possessed. Otherwise, an error message or similar notification could be provided to the user or requesting machine.

If the determination is made that the requested source code has been previously processed (step 1112), then the previously processed source code information can be retrieved directly from the source code database (1114) and provided to the requestor (1116), assuming that the user or requesting machine possessed the requisite access rights. Otherwise, again, an error message or similar notification could be provided to the user or requesting machine.

One or more foregoing steps or processes can repeatedly for subsequent processing or source code requests (step 1122) as desired.

In addition, in situations where a user views limited source code information and thereafter desires access to the source code itself since it may be relevant to a project on which the user is working, the user may contact a developer or team leader for the source code to receive enhanced access rights like illustrated in FIG. 6. Direct links for direct contact with code maintainers or developers can be used.

There are multiple benefits of various aspects of this disclosure. One is visibility. Some or all source code components can be searchable with details such as committers, versions, tool URLs, reusability, dependencies, dependents, and the like. Another benefit is easy identification by additional metadata such as labels, source code summaries, contact information for developers and team leaders, etc., which can be driven by component owners themselves or administrators if desired. Still another benefit is gamification, whereby ratings, dependency counts, view counts, and the like allow the development community to know components in top categories. It also promotes good governance to leverage git models or the like to control component evolution and contribution. Another benefit is unification. This disclosure can provide one-stop shopping for developers and administrators by providing a single eco-system to discover some or all components in a company. It also allows certification of the best in class components by technology. In essence, this disclosure provides a seamless flow of information in order to break development silos while still maintaining information security and confidentiality. It further encourages transparency while preserving the governance model. It also improves code quality and reduces risk as well as time to market or deployment.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A file management computing platform for providing limited access to and information about software source code to a client computing machine, the client computing machine having a display screen, the file management computing platform comprising:
   a. a first source code repository containing first source code;
   b. a server computing machine having:
      i. at least one server processor;
      ii. at least one server communication interface communicatively coupled to the at least one server processor, the first source code repository, and the client computing machine;
      iii. server memory communicatively coupled to the server communication interface, said server memory storing server computer-readable instructions that, when executed by the at least one server processor, cause the server computing machine to:
         1. access, by the at least one server processor via the at least one server communication interface, the first source code repository;
         2. extract, by the at least one server processor from the first source code repository, first metadata corresponding to said first source code;
         3. store, by the at least one server processor, the first metadata in a first sector of the server memory;
         4. parse, by the at least one server processor, the first metadata into first parsed data;
         5. store, by the at least one server processor, the first parsed data in a second sector of the server memory;
         6. normalize, by the at least one server processor, the parsed data into first normalized data;
         7. create, by the at least one server processor in a third sector of the server memory, a source code database;
         8. store, by the at least one server processor, the first normalized data in the source code database;
         9. perform, by the at least one server processor, first analytic processing, on either the first source code information or the first source code, to generate first analytic data;
         10. store, by the at least one server processor, the first analytic data in the source code database;
         11. generate, by the at least one server processor, a search portal graphical user interface instructions to enable a search, by the client computing machine, regarding the first source code;
         12. transmit, by the at least one server processor via the server communication interface to the client computing machine, the search portal graphical user interface instructions, wherein transmitting the search portal graphical user interface instructions to the client computing machine causes the client computing machine to display a search portal graphical user interface on the display screen on the client computing machine;
         13. receive, by the at least one server processor from the client computing machine, a search request regarding the first source code;
         14. if the search request corresponds to software in the first source code repository:
            a. determine, by the at least one server processor, first access rights for the client computing machine with respect to the first source code;
            b. extract, by the at least one server processor from the source code database, the first source code information;
            c. generate, by the at least one server processor, a search result graphical user interface instructions for at least some of the first source code information based on the client computing machines' first access rights; and
            d. transmit, by the at least one server processor via the server communication interface to the client computing machine, the search result graphical user interface instructions, wherein transmitting the search result graphical user interface instructions to the client computing machine causes the client computing machine to display the search result graphical user interface on the display screen on the client computing machine, wherein the search result graphic user interface displayed on the client computing machine's display screen contains said at least some of the first source code information, and
         wherein an access level provided to said at least some of the first source of information is less than full access to the first source code.

2. The file management computing platform of claim 1 wherein the search may be limited by projects, dependencies, repositories, software product keys, or tags.

3. The file management computing platform of claim 2 wherein the search result graphical user interface further comprises:
   a. a demonstration URL to a demonstration of the first source code;

b. a documentation URL to documentation regarding the first source code;

c. an issues URL to an issues list, said issues list identifying issues with the first source code; and d. a release note URL to a release notes for the first source code.

4. The file management computing platform of claim 1 wherein the search portal graphical user interface autopopulates the search request based on search text received from the client machine.

5. The file management computing platform of claim 1 wherein the search result graphical user interface provides an opportunity for a narrowing search.

6. The file management computing platform of claim 5 wherein the search result graphical user interface displays search results that include: a source code name, a project name, a software product key, a rating, and a lock icon.

7. The file management computing platform of claim 6 wherein the source code name, the project name, the software product key, the rating, and the lock icon are URLs.

8. The file management computing platform of claim 6 wherein the search result graphical user interface provides a details URL to obtain details regarding the search results.

9. The file management computing platform of claim 1 wherein the search result graphical user interface includes:

a. a ReadMe URL to a ReadMe file for the first source code, said ReadMe file providing textual information describing the first source code;

b. a maintainer URL to a maintainer list, said maintainer list identifying individual responsible for maintaining the first source code;

c. a version URL to version list, said version list identifying each version of the first source code;

d. a dependencies URL to a dependencies list, said dependencies list identifying foundational source code on which the first source code is at least partially based;

e. a dependent URL to a dependent list, said dependent list identifying dependent source code that was developed based on the first source code; and f. a review URL to a review list of reviews of the first source code.

10. The file management computing platform of claim 9 wherein, in response to selection of the ReadMe URL, ReadMe information from the ReadMe file is displayed in a ReadMe graphical user interface on the client computing machine's display screen.

11. The file management computing platform of claim 10 wherein the ReadMe information includes:

a. usage information regarding the first source code;

b. development setup information regarding the first source code;

c. release history information regarding the first source code;

d. news information regarding the first source code; and e. contribution information regarding development based on the first source code.

12. The file management computing platform of claim 10 wherein the ReadMe graphical user interface on the client computing machine's display screen contains action URLs and navigation URLs.

13. The file management computing platform of claim 12 wherein the action URLs include cloning, branch creation, and pull request creation.

14. The file management computing platform of claim 12 wherein the navigation URLs include source, commits, branches, network, pull requests, and forks.

15. The file management computing platform of claim 1 wherein the first analytic data includes dependencies and dependents for the first source code.

16. The file management computing platform of claim 1 further comprising a second source code repository containing second source code which is unprocessed and wherein said server memory stores further server computer-readable instructions that, when executed by the at least one server processor, cause the server computing machine to:

a. determine, by the at least one server processor, whether the search request corresponds to the second source code;

b. if the search request corresponds to the second source code:

i. process on-demand, by the at least one server processor, the second source code into processed data;

ii. store, by the at least one server processor, the processed data in the source code database;

iii. determine, by the at least one server processor, second access rights for the client computing machine with respect to the second source code;

iv. extract, by the at least one server processor from the source code database, second source code information regarding the second source code;

v. generate, by the at least one server processor, second graphical user interface instructions for at least some of the second source code information based on the client computing machines' second access rights; and vi. transmit, by the at least one server processor via the server communication interface to the client computing machine, the second graphical user interface instructions, which cause a second graphical user interface to be displayed on the display screen on the client computing machine, whereby the second graphic user interface displayed on the client computing machine's display screen contains said at least some of the second source code information, wherein said at least some of the second source of information is less than full access to the second source code.

17. The file management computing platform of claim 16 wherein processing of the second source code includes second analytic processing, on either the second source code information or the second source code, to generate second analytic data, and wherein the second analytic data is stored in the source code database.

18. The file management computing platform of claim 17 wherein the second graphical user interface includes:

a. a ReadMe URL to a ReadMe file for the second source code, said ReadMe file providing textual information describing the second source code including:

i. usage information regarding the second source code;

ii. development setup information regarding the second source code;

iii. release history information regarding the second source code;

iv. news information regarding the second source code; and v. contribution information regarding development based on the second source code, wherein the textual information describing the second source code is displayed in a ReadMe user interface on the client computing machine's display screen in response to selection of the ReadMe URL.

* * * * *